United States Patent
Chen

(10) Patent No.: US 10,691,100 B2
(45) Date of Patent: Jun. 23, 2020

(54) METHOD, DEVICE FOR MACHINE PROCESSING TRAJECTORY SPACE DETECTION AND NUMERICAL CONTROL MACHINE

(71) Applicant: BEIJING A & E TECHNOLOGIES CO., LTD, Beijing (CN)

(72) Inventor: Xiaoying Chen, Shenzhen (CN)

(73) Assignee: SHENZHEN A&E INTELLIGENT TECHNOLOGY INSTITUTE CO., LTD., Shenzhen, Guangdong Province (CN)

( * ) Notice: Subject to any disclaimer, the term of this patent is extended or adjusted under 35 U.S.C. 154(b) by 400 days.

(21) Appl. No.: 15/523,368

(22) PCT Filed: Oct. 22, 2015

(86) PCT No.: PCT/CN2015/092551
§ 371 (c)(1),
(2) Date: Jul. 26, 2017

(87) PCT Pub. No.: WO2016/066052
PCT Pub. Date: May 6, 2016

(65) Prior Publication Data
US 2017/0343981 A1 Nov. 30, 2017

(30) Foreign Application Priority Data
Oct. 29, 2014 (CN) .......................... 2014 1 0594724

(51) Int. Cl.
*G06F 17/00* (2019.01)
*G05B 19/4061* (2006.01)

(52) U.S. Cl.
CPC ............ *G05B 19/4061* (2013.01); *G05B 2219/40339* (2013.01); *G05B 2219/40519* (2013.01)

(58) Field of Classification Search
USPC ........................................................ 700/187
See application file for complete search history.

(56) References Cited

U.S. PATENT DOCUMENTS

2010/0063612 A1* 3/2010 Wang ................... B23Q 17/20
700/110
2015/0205283 A1* 7/2015 Brand ................ G05B 19/4103
700/186

(Continued)

FOREIGN PATENT DOCUMENTS

| CN | 102063546 A | 5/2011 |
| CN | 103279608 A | 9/2013 |

(Continued)

*Primary Examiner* — Md Azad
(74) *Attorney, Agent, or Firm* — Cheng-Ju Chiang

(57) ABSTRACT

The present disclosure provides a method, devices, a numerical control machine, and a computer storage medium for detecting machine processing trajectory space. The method includes: obtaining data of a trajectory AB of a machine processing and spatial data of a specified space area; converting a function of the data of the trajectory AB into a univariate function P=f (u) with respect to a trajectory parameter u; determining a point set $U_i$ of the trajectory AB on an inner side of each curved surface $S_i$ based on spatial data of the individual curved surfaces $S_i$ forming the specified space area and the function P=f(u); and determining a positional relationship between the trajectory AB and the specified space area based on the point sets $U_i$.

4 Claims, 13 Drawing Sheets

(56) References Cited

U.S. PATENT DOCUMENTS

2016/0187866 A1* 6/2016 Noda ................. G05B 19/4093
  700/187
2018/0207799 A1* 7/2018 Bretschneider ........ B25J 9/1666

FOREIGN PATENT DOCUMENTS

| CN | 104391481 A | * | 3/2015 | ......... G05B 19/4061 |
| CN | 104391481 A | | 3/2015 | |
| JP | 2001-242921 A | | 9/2001 | |

* cited by examiner

METHOD, DEVICE FOR MACHINE PROCESSING TRAJECTORY SPACE DETECTION AND NUMERICAL CONTROL MACHINE

TECHNICAL FIELD

Embodiments of the present disclosure generally relate to machine processing application technology, and in particular relate to a method, devices and a numerical control machine for detecting machine processing trajectory space.

BACKGROUND

In the process of machine processing, in order to prevent the tool or the arm from colliding and causing safety problems during the motion of machine processing, an area (usually a cuboid or a cylinder) is specified before transmitting a motion instruction to a machine or a robot, so as to indicate that a trajectory is overtravel when the trajectory exceeds the specified area (in the case that the area is a safe area) or enters the area (in the case that the area is a prohibited area), which is a detection process known as safe area detection.

In the prior art, the trajectory is determined to be within the specified area or outside the specified area through the spatial geometry algorithm directly, in which the presumed conditions are individually made based on different positional relationships between the trajectory and the specified area, and then the determination is performed. Therefore, the algorithm will be quite large, the complexity of the determination of the geometric space relationship will exponentially increases because of the complexity of the geometric shape, and the presumption is likely to miss some possible cases.

SUMMARY

The technical problem to be solved by the present disclosure is to provide a method, devices, a numerical control machine, and a computer storage medium for detecting machine processing trajectory space, so that the analysis based on the relationship between spatial geometries is not necessary when determining the spatial geometry relationship between a trajectory and a specified space area, which reduces the complexity of the algorithm, and improve the flexibility and expansibility.

In order to solve the above-mentioned problems, the present disclosure provides a method for detecting machine processing trajectory space. The method includes: obtaining data of a trajectory AB of a machine processing; obtaining spatial data of a specified space area; converting a function of the data of the trajectory AB into a univariate function P=f (u) which is with respect to a trajectory parameter u, where P is any point on the trajectory AB; determining a point set $U_i$ of the trajectory AB on an inner side of each curved surface $S_i$ based on spatial data of the individual curved surfaces $S_i$ forming the specified space area and the function P=f (u), where 1≤i≤m, and m is the amount of the curved surface forming the specified space area; and determining a positional relationship between the trajectory AB and the specified space area based on the point sets $U_i$.

In one embodiment, the determining the point set $U_i$ of the trajectory AB on the inner side of each curved surface $S_i$ based on spatial data of the individual curved surfaces $S_i$ forming the specified space area and the function P=f (u) includes: utilizing a first inequality as follows to calculate the point set $U_i$ of the trajectory AB on the inner side of each curved surface $S_i$:

$$\vec{PM} \times \vec{n} < 0;$$

where, P is any point on the trajectory AB, M is a projection point of the point P on the curved surface $S_i$, $\vec{n}$ is a normal vector of the curved surface $S_i$ pointing to the inner side of the specified space area, and $\vec{n}$ passes through the point M.

In one embodiment, the determining the positional relationship between the trajectory AB and the specified space area based on the point sets $U_i$ includes: obtaining an intersection $U_z=U_1 \cap U_2 \ldots \cap U_m$ of the point sets $U_i$; and determining that the trajectory AB is on the inner side of all the curved surfaces $S_i$ if $U_T \subset U_z$, so as to determine that the trajectory AB is on an inner side of the specified space area, where $U_T$ is a set of the point sets of the trajectory AB.

In one embodiment, the determining the positional relationship between the trajectory AB and the specified space area based on the point sets $U_i$ includes: obtaining an intersection $U_z=U_1 \cap U_2 \ldots \cap U_m$ of the point sets $U_i$; and determining that the trajectory AB is completely outside the specified space area if $U_z \cap U_T = \emptyset$, where $U_T$ is a set of the point sets of the trajectory AB.

In order to solve the above-mentioned problems, the present disclosure also provides a device for detecting machine processing trajectory space. The device includes: a first obtaining unit configured to obtain data of a trajectory AB of a machine processing; a second obtaining unit configured to obtain spatial data of a specified space area; a converting unit configured to convert a function of the data of the trajectory AB obtained by the first obtaining unit into a univariate function P=f (u) which is with respect to a trajectory parameter u, where P is any point on the trajectory AB; a calculating unit configured to determine spatial data of individual curved surfaces $S_i$ forming the specified space area based on the spatial data of the specified space area obtained by the second obtaining unit, and calculate a point set $U_i$ of the trajectory AB on an inner side of each curved surface $S_i$ based on the spatial data of the individual curved surfaces $S_i$ and the function P=f (u) produced by the converting unit, where 1≤i≤m, and m is the amount of the curved surface forming the specified space area; and a position determining unit configured to determine a positional relationship between the trajectory AB and the specified space area based on the point sets $U_i$ obtained by the calculating unit.

In one embodiment, the calculating unit is configured to calculate the point set $U_i$ of the trajectory AB on the inner side of each curved surface $S_i$ based on a first inequality as follows:

$$\vec{PM} \times \vec{n} < 0;$$

where, P is any point on the trajectory AB, M is a projection point of the point P on the curved surface $S_i$, $\vec{n}$ is a normal vector of the curved surface $S_i$ pointing to the inner side of the specified space area, and $\vec{n}$ passes through the point M.

In one embodiment, the position determining unit is configured to determine an intersection $U_z=U_1 \cap U_2 \ldots \cap U_n$ of the point sets $U_i$ based on the point sets $U_i$ obtained by the calculating unit, and determine that the trajectory AB is on an inner side of the specified space area if $U_T \subset U_z$; where $U_T$ is a set of the point sets of the trajectory AB.

In one embodiment, the position determining unit is configured to determine an intersection $U_z = U_1 \cap U_2 \ldots \cap U_n$ of the point sets $U_i$ based on the point sets $U_i$ obtained by the calculating unit, and determines that the trajectory AB is completely outside the specified space area if $U_z \cap U_T = \emptyset$; where $U_T$ is a set of the point sets of the trajectory AB.

In order to solve the above problems, the present disclosure also provides a numerical control machine. The numerical control machine includes a machine body and a numerical control system installed on the machine body. The numerical control system includes a machine processing trajectory space detecting module. The machine processing trajectory space detecting module includes: a first obtaining unit configured to obtain data of a trajectory AB of a machine processing; a second obtaining unit configured to obtain spatial data of a specified space area; a converting unit configured to convert a function of the data of the trajectory AB obtained by the first obtaining unit into a univariate function P=f (u) which is with respect to a trajectory parameter u, where P is any point on the trajectory AB; a calculating unit configured to determine spatial data of individual curved surfaces $S_i$ forming the specified space area based on the spatial data of the specified space area obtained by the second obtaining unit, and calculate a point set $U_i$ of the trajectory AB on an inner side of each curved surface $S_i$ based on the spatial data of the individual curved surfaces $S_i$ and the function P=f (u) produced by the converting unit, where $1 \leq i \leq m$, and m is the amount of the curved surface forming the specified space area; and a position determining unit configured to determine a positional relationship between the trajectory AB and the specified space area based on the point sets $U_i$ obtained by the calculating unit.

In one embodiment, the numerical control system further includes: an alarm module configured to issue an alarm information when the positional relationship between the trajectory AB and the specified space area determined by the machine processing trajectory space detecting module does not meet a predetermined safety relationship.

In order to solve the above problems, the present disclosure also provides a machine processing trajectory space detecting device. The device includes a memory and a processor connected to the memory. The processor is configured to: obtain data of a trajectory AB of a machine processing; obtain spatial data of a specified space area; convert a function of the data of the trajectory AB into a univariate function P=f (u) which is with respect to a trajectory parameter u, where P is any point on the trajectory AB; determine a point set $U_i$ of the trajectory AB on an inner side of each curved surface $S_i$ based on spatial data of the individual curved surfaces $S_i$ forming the specified space area and the function P=f (u), where $1 \leq i \leq m$, and m is the amount of the curved surface forming the specified space area; and determine a positional relationship between the trajectory AB and the specified space area based on the point sets $U_i$.

In one embodiment, the processor is further configured to: utilize a first inequality as follows to calculate the point set $U_i$ of the trajectory AB on the inner side of each curved surface $S_i$:

$$\overrightarrow{PM} \times \overrightarrow{n} < 0;$$

where, P is any point on the trajectory AB, M is a projection point of the point P on the curved surface $S_i$, $\overrightarrow{n}$ is a normal vector of the curved surface $S_i$ pointing to the inner side of the specified space area, and $\overrightarrow{n}$ passes through the point M.

In one embodiment, the processor is further configured to: obtain an intersection $U_z = U_1 \cap U_2 \ldots \cap U_m$ of the point sets $U_i$; determine that the trajectory AB is on the inner side of all the curved surfaces $S_i$ if $U_T \subset U_z$, so as to determine that the trajectory AB is on an inner side of the specified space area, where $U_T$ is a set of the point sets of the trajectory AB.

In one embodiment, the processor is further configured to: obtain the intersection $U_z = U_1 \cap U_2 \ldots \cap U_m$ of the point sets $U_i$; determine that the trajectory AB is completely outside the specified space area if $U_z \cap U_T = \emptyset$, where $U_T$ is a set of the point sets of the trajectory AB.

In order to solve the above-mentioned problems, the present disclosure also provides a computer storage medium. The computer storage medium includes computer program codes, where the computer program codes cause a computer processor to execute a machine processing trajectory space detecting method when the computer program codes are executed by the computer processor. The method includes: obtaining data of a trajectory AB of a machine processing; obtaining spatial data of a specified space area; converting a function of the data of the trajectory AB into a univariate function P=f (u) with respect to a trajectory parameter u, where P is any point on the trajectory AB; determining a point set $U_i$ of the trajectory AB on an inner side of each curved surface $S_i$ based on spatial data of the individual curved surfaces $S_i$ forming the specified space area and the function P=f (u), where $1 \leq i \leq m$, and m is the amount of the curved surface forming the specified space area; and determining a positional relationship between the trajectory AB and the specified space area based on the point sets $U_i$.

In one embodiment, the determining the point set $U_i$ of the trajectory AB on the inner side of each curved surface $S_i$ based on spatial data of the individual curved surfaces $S_i$ forming the specified space area and the function P=f (u) includes: utilizing a first inequality as follows to calculate the point set $U_i$ of the trajectory AB on the inner side of each curved surface $S_i$:

$$\overrightarrow{PM} \times \overrightarrow{n} < 0;$$

where, P is any point on the trajectory AB, M is a projection point of the point P on the curved surface $S_i$, $\overrightarrow{n}$ is a normal vector of the curved surface $S_i$ pointing to the inner side of the specified space area, and $\overrightarrow{n}$ passes through the point M.

The disclosure provides a method, devices, numerical control machines, and a computer storage medium for detecting machine processing trajectory space, which express the spatial curve via a univariate function so as to participate in the operation of the space area for the curve, express the point sets of any portion of the trajectory via the trajectory parameter set, determines the position of the individual curved surfaces forming the space area and the trajectory, and eventually determine the positions of the space area and the curve. Consequently, the defect of algorithm explosion caused by the space geometry operation which needs to analysis the specific area and straight line type is overcame, which reduces the quantity of operations, and has high reusability.

DETAILED DESCRIPTION

The technical solutions in the embodiments of the present invention will be described in detail below in connection with the drawings in the embodiments of the present disclosure. Obviously, the described embodiments are merely part of the embodiments of the present disclosure, not all embodiments. Based on the embodiments in the present disclosure, all other embodiments can be obtained by those skilled in the art without making creative work are within the scope of the protection of the present disclosure.

Figure 1:
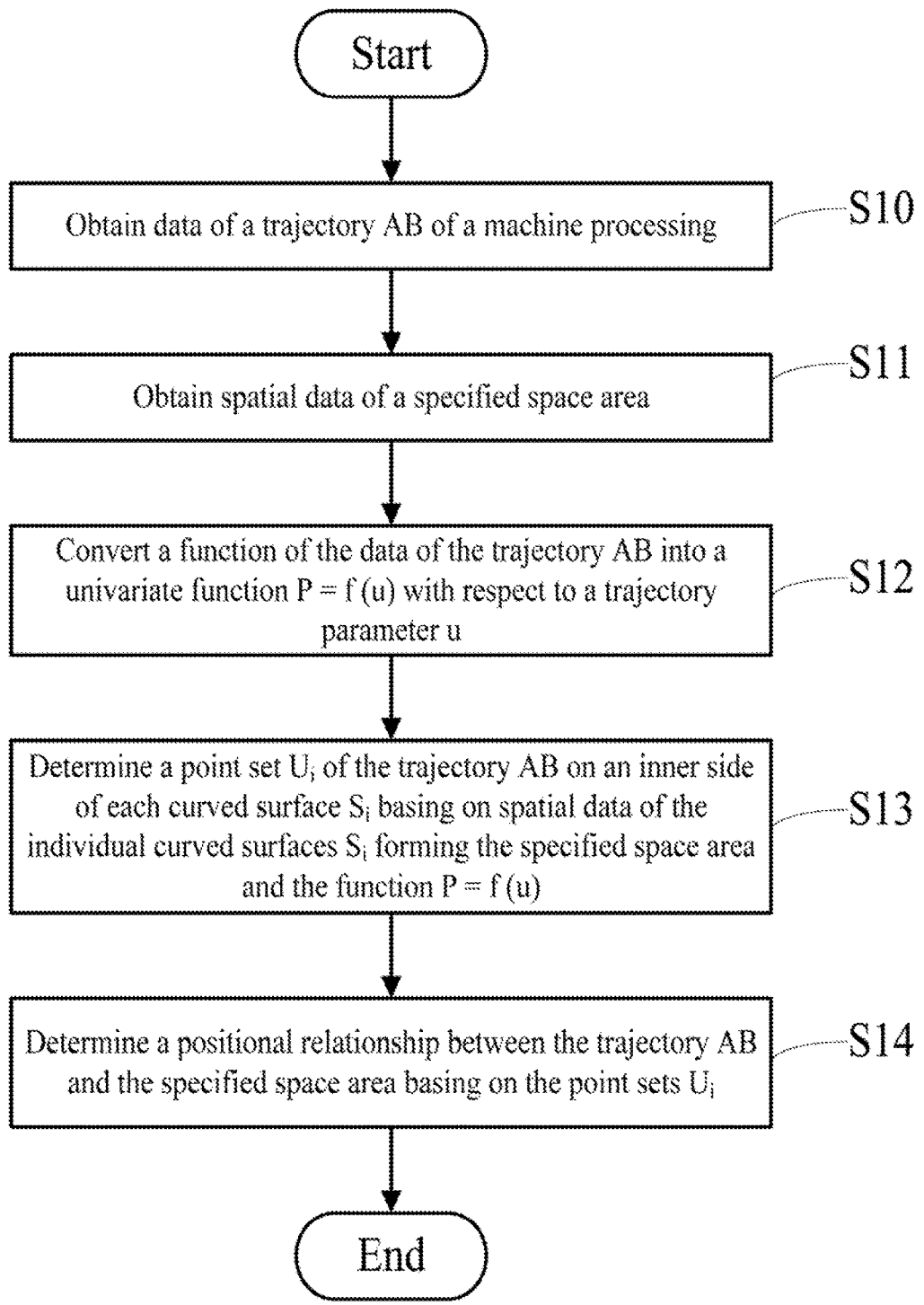
FIG. 1 is a flow chart of a machine processing trajectory space detecting method according to a first embodiment of the present disclosure.

Referring to FIG. 1, a flow chart of a machine processing trajectory space detecting method according to a first embodiment of the present disclosure is depicted. The method may include the following blocks.

At S10: obtaining data of a trajectory AB of a machine processing.

At S11: obtaining spatial data of a specified space area.

At S12: converting a function of the data of the trajectory AB into a univariate function P=f (u) which is with respect to a trajectory parameter u, where P is any point on the trajectory AB.

At S13: determining a point set $U_i$ of the trajectory AB on an inner side of each curved surface $S_i$ based on spatial data of the individual curved surfaces $S_i$ forming the specified space area and the function P=f (u).

Where, $1 \leq i \leq m$, and m is the amount of the curved surface forming the specified space area.

At S14: determining a positional relationship between the trajectory AB and the specified space area based on the point sets $U_i$.

Figure 2:
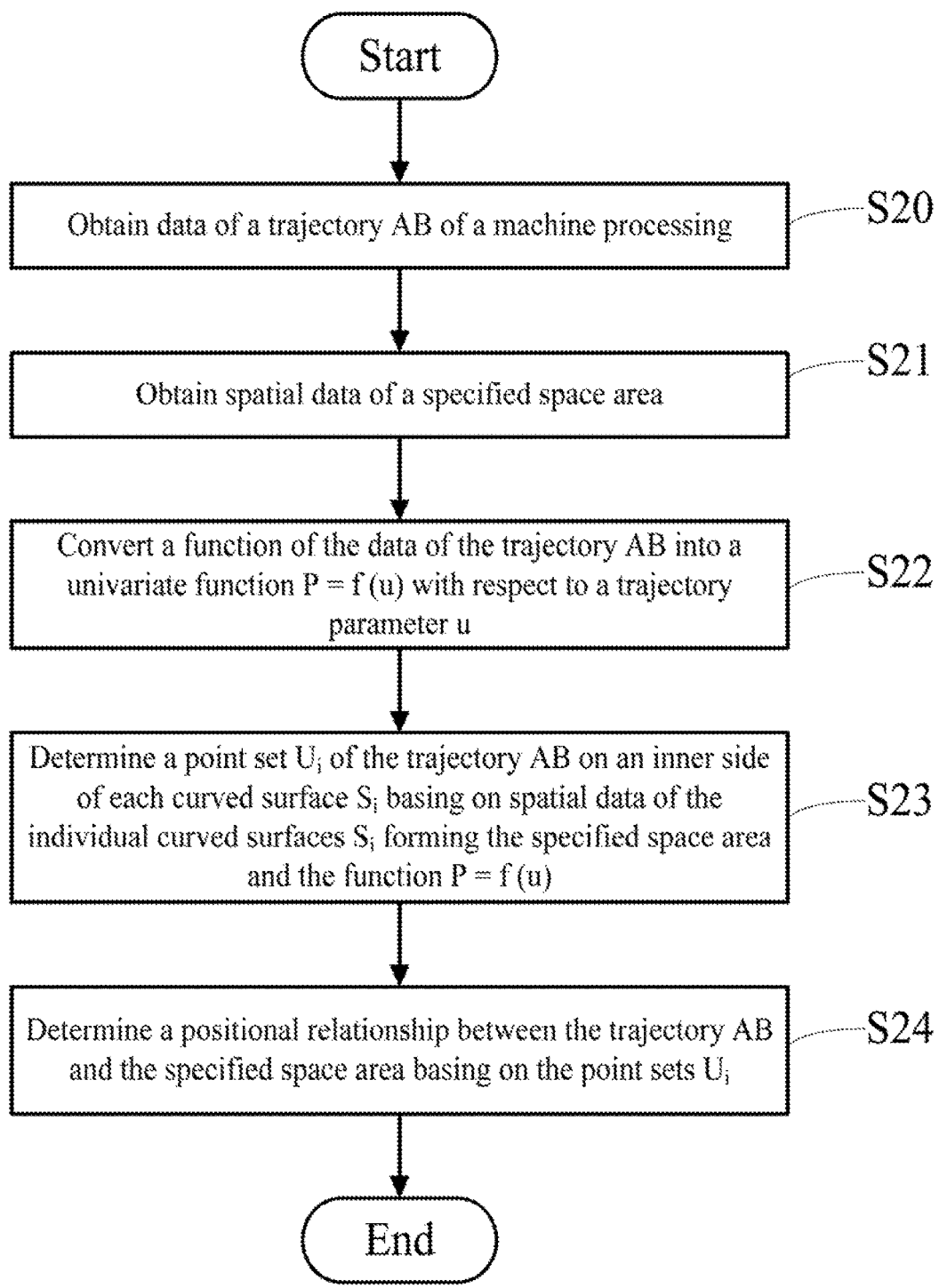
FIG. 2 is a flow chart of a machine processing trajectory space detecting method according to a second embodiment of the present disclosure.

Referring to FIG. 2, a flow chart of a machine processing trajectory space detecting method according to a second embodiment of the present disclosure is depicted. The method may include the following blocks.

At S20: obtaining data of a trajectory AB of a machine processing.

Where, the trajectory AB may be a straight line, an arc, a parabola, etc.

At S21: obtaining spatial data of a specified space area.

Where, any spatial area can enclose a plurality of curved surfaces to form, for example, a cuboid which is formed by enclosing six planes, in which normal vectors of the six planes point to the direction of the center of the cuboid; a cylinder is which formed by enclosing a cylindrical curved surface and two bottom surfaces, in which normal vectors of the two bottom surfaces points to the direction of the center of the cylinder, and a plane normal vector of the cylindrical curved surface points inwardly toward the cylinder.

At S22: converting a function of the data of the trajectory AB into a univariate function P=f (u) which is with respect to a trajectory parameter u. Where, P is any point on the trajectory AB.

At S23: determining a point set $U_i$ of the trajectory AB on an inner side of each curved surface $S_i$ based on spatial data of the individual curved surfaces $S_i$ forming the specified space area and the function P=f (u).

Where, $1 \leq i \leq m$, and m is the amount of the curved surface forming the specified space area.

For instance, the step S23 can specifically include: utilizing a first inequality as follows to calculate the point set $U_i$ of the trajectory AB on the inner side of each curved surface $S_i$:

the first inequality $$\overrightarrow{PM} \times \overrightarrow{n} < 0$$

where P is any point on the trajectory AB, M is a projection point of the point P on the curved surface $S_i$, $\overrightarrow{n}$ is a normal vector of the curved surface $S_i$ pointing to the inner side of the specified space area, and $\overrightarrow{n}$ passes through the point M.

At S24: determining a positional relationship between the trajectory AB and the specified space area based on the point sets $U_i$.

Figure 3:
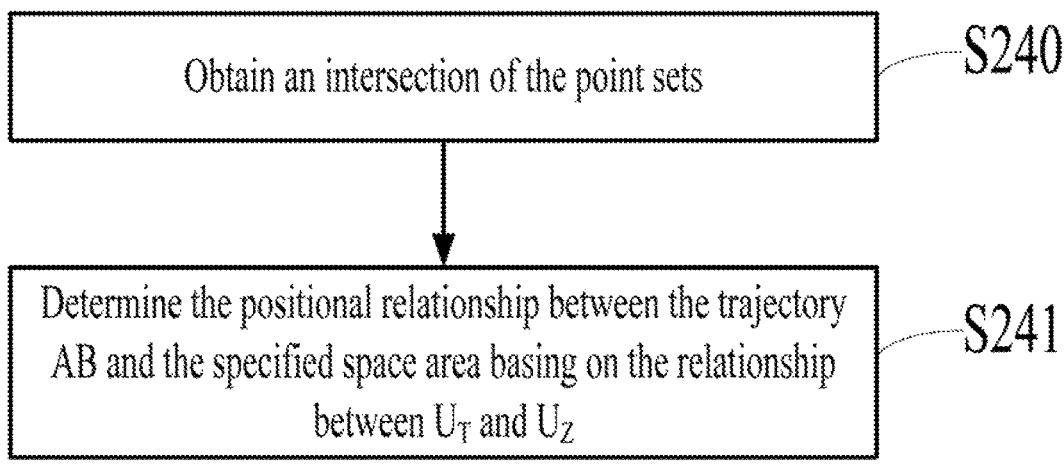
FIG. 3 is a flow chart of a method for determining a positional relationship between a trajectory and a specified space area according to an embodiment of the present disclosure.

Referring to FIG. 3, a flow chart of a method for determining a positional relationship between a trajectory and a specified space area according to an embodiment of the present disclosure is depicted. The method may include the following blocks.

At S240: obtaining an intersection of the point sets $U_i$.

At S241: determining the positional relationship between the trajectory AB and the specified space area based on the relationship between $U_T$ and $U_z$. Specifically, if $U_T \subset U_z$, the trajectory AB is determined to be on the inner side of all the curved surfaces $S_i$, thereby determining that the trajectory AB is on an inner side of the specified space area. If $U_z \cap U_T = \emptyset$, the trajectory AB is determined to be completely outside the specified space area. Where, $U_T$ is a set of the point sets of the trajectory AB.

Figure 4:
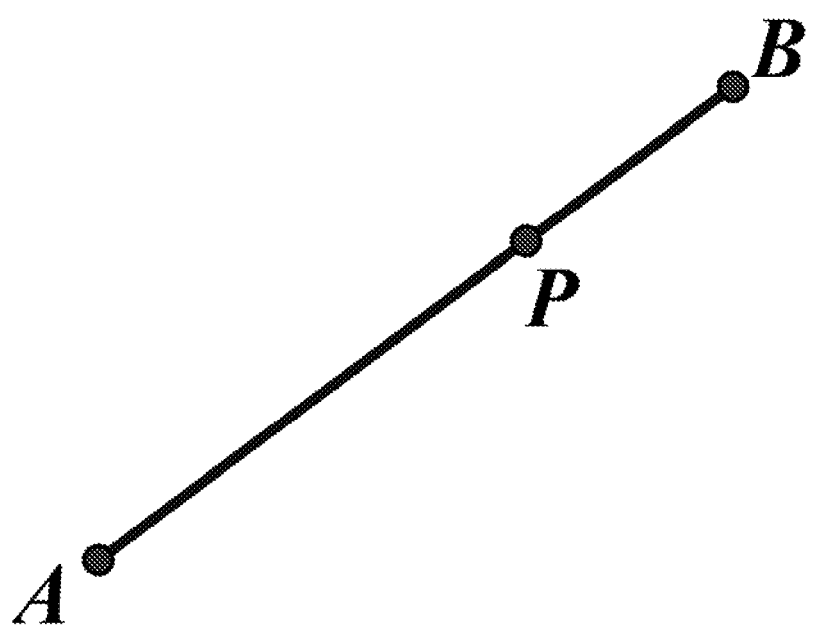
FIG. 4 is a schematic diagram of determining the position of any point on the trajectory in the case that the trajectory is a straight line.
Figure 5:
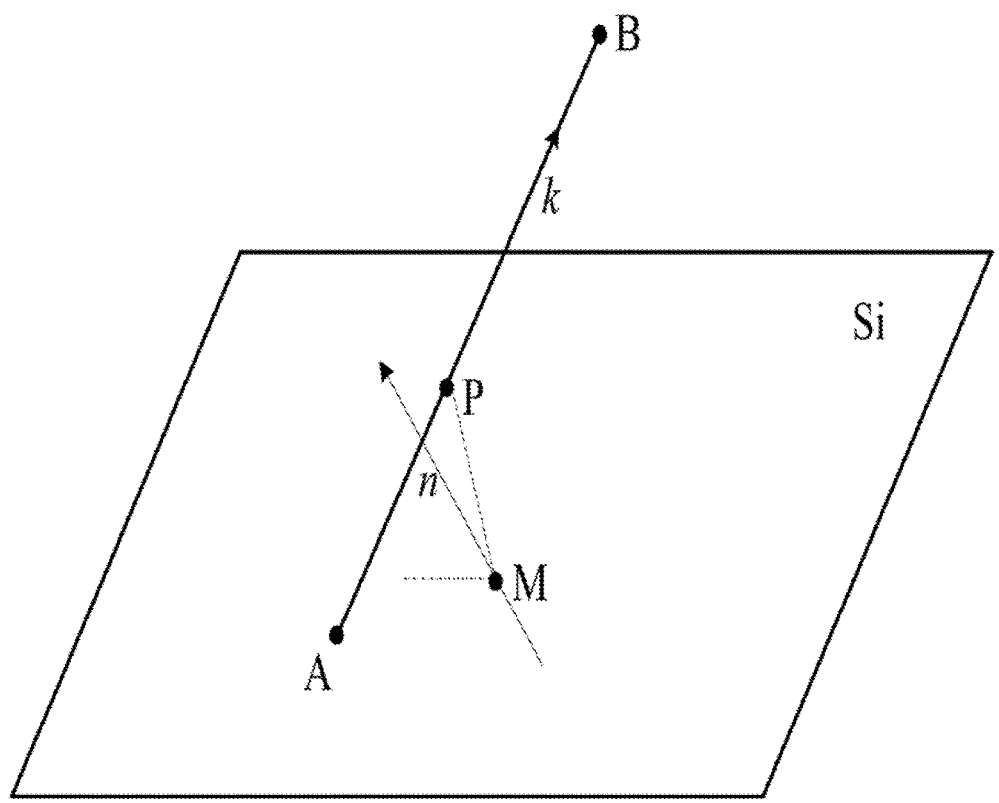
FIG. 5 is a schematic diagram of determining a point set of the trajectory on an inner side of a curved surface in the case that the trajectory is a straight line.

Referring to FIGS. 4 and 5, in which the present disclosure will be described in detail below with the trajectory AB as a straight line.

In the case that the trajectory AB corresponding to the obtained data is a straight line, any point on the trajectory AB is assumed as P. Where, the point A is a start point of the trajectory AB, and the point B is an end point of the trajectory AB. The trajectory parameter u is directly proportional to the distance between the point P and the start point A, and the value of the trajectory parameter u is 0 when the point P coincides with the point A.

At this time, the univariate function P=f (u) can be expressed as:

$$P = A + u \times \vec{k} \qquad (1)$$

Where, $\vec{n}$ is a unit direction vector of the straight line AB. In the case that the trajectory parameter u is zero, the position of the point P is the position of the start point A. In the case that the trajectory parameter u is positive, the position of a point which the start point A points to the direction of the unit direction vector $\vec{n}$ is the position of the point P; when the track parameter u is negative, the position of a point which the start point A points to a direction contrary to the unit direction vector $\vec{n}$ is the position of the point P.

Furthermore, M is a projection point of the point P on the curved surface $S_i$, $\vec{n}$ is a normal vector of the curved surface $S_i$ pointing to the inner side of the specified space area, and $\vec{n}$ passes through the point M. According to the formula (1):

$$\vec{PM} = A + u \times \vec{k} - M = \vec{MA} + u \times \vec{k} \qquad (2)$$

Therefore, based on the first inequality and the formula (2), a point set of the straight line AB on a side of the normal vector $\vec{n}$ satisfies the following inequality:

$$\vec{MA} \times \vec{n} + u\left(\vec{k} \times \vec{n}\right) < 0 \qquad (3)$$

The range of the trajectory parameter u, that is, the point set $U_i$ of the straight line AB on the inner side of the surface $S_i$, is obtained by solving the inequality (3).

Figure 6:
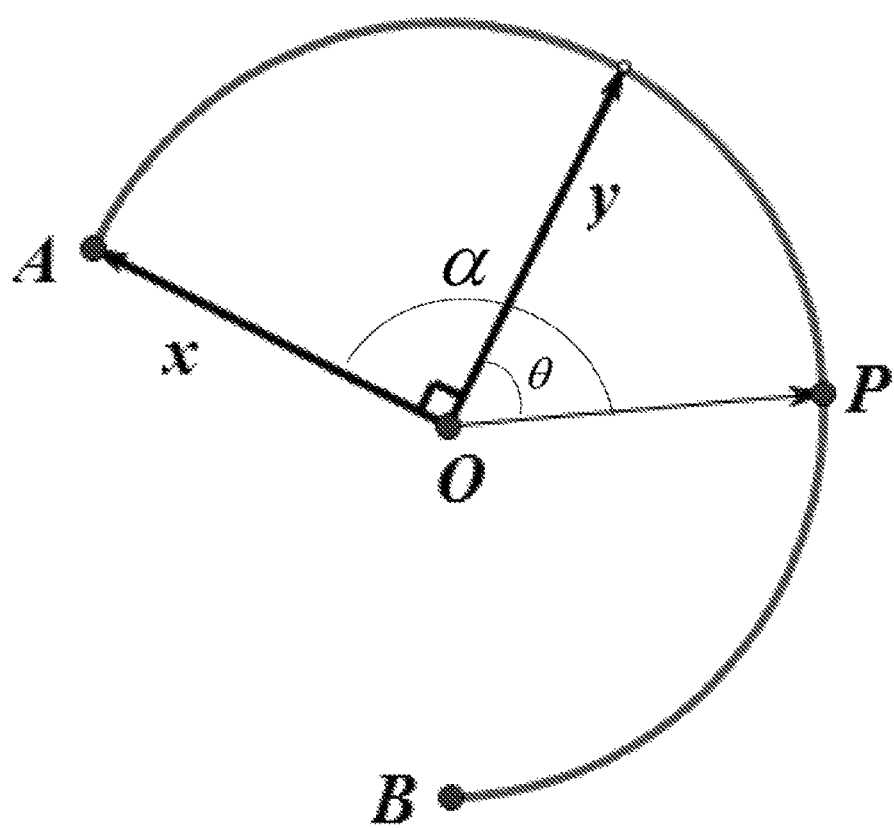
FIG. 6 is a schematic diagram of determining the position of any point on the trajectory in the case that the trajectory is an arc.
Figure 7:
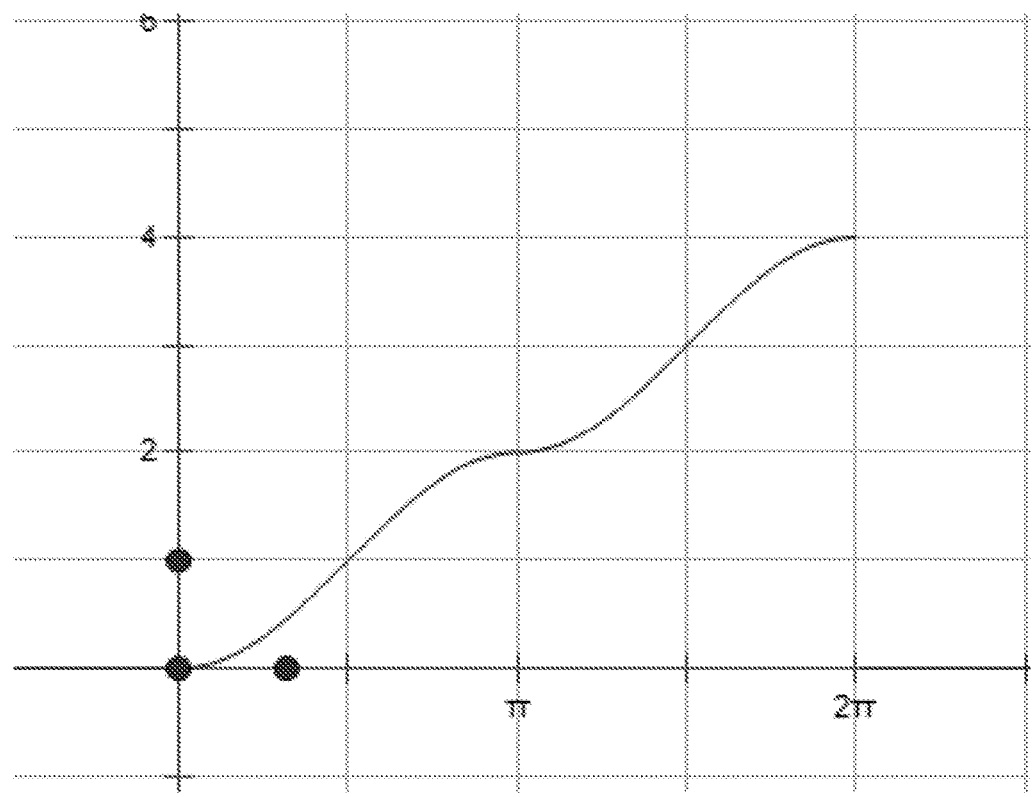
FIG. 7 is a schematic diagram of the relationship between the range of $\theta$ and the trajectory parameter u.
Figure 8:
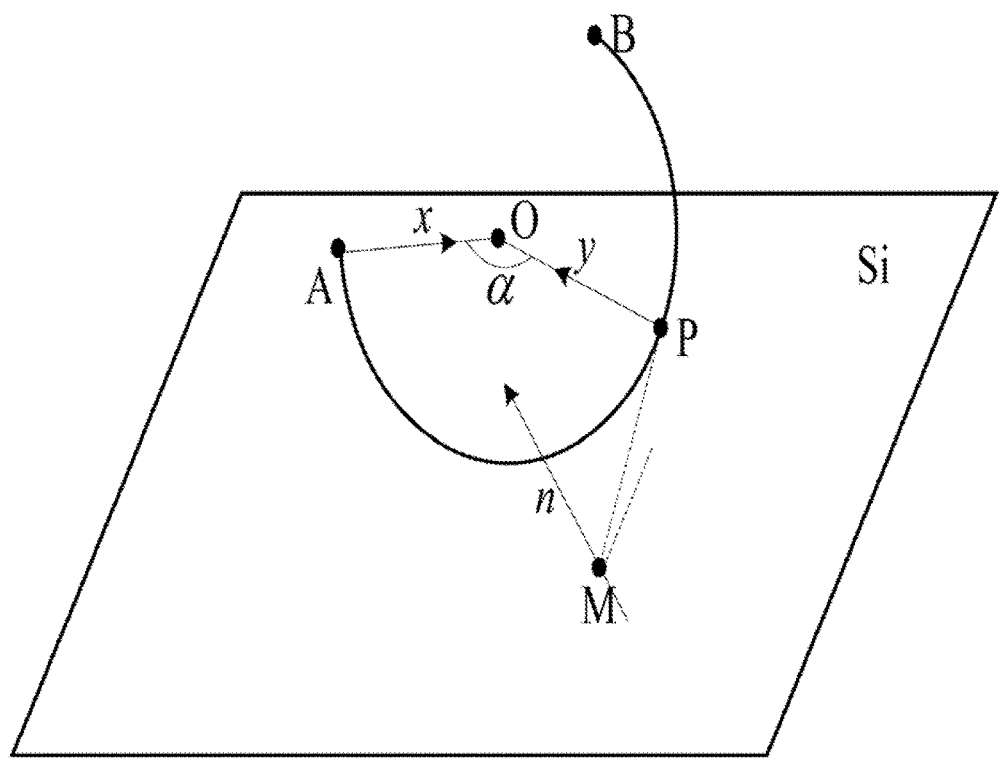
FIG. 8 is a schematic diagram of determining a point set of the trajectory on an inner side of a curved surface in the case that the trajectory is an arc.

Referring to FIG. 6, FIG. 7, and FIG. 8, in which the present disclosure will be described in detail below with the trajectory AB as an arc.

In the case that the trajectory AB corresponding to the obtained data is an arc, an arc from the start point A to the end point B which is in a counterclockwise direction is assumed as the arc AB, while O is the center of a circle where the arc AB is, and R is the radius of the circle O. The position of P is obtained by rotating a vector $\vec{QA}$ counterclockwise for an angle α with O as the center and R as the radius. Assuming that a unit vector in the direction of the vector $\vec{QA}$ is $\vec{x}$, a unit vector rotated for 90° along the rotation direction of the arc AB (i.e., counterclockwise) is $\vec{y}$ and θ=α−90°, the position of the point P can be expressed as:

$$P = O + R\left(\vec{x} \cos\theta + \vec{y} \sin\theta\right) \qquad (4)$$

Furthermore, a cosine value cos θ of the angle θ is calculated based on the coordinate of the point P and the formula (4), and the trajectory parameter u can be expressed using the cosine value cos θ based on the range of 0:

$$u = \begin{cases} -\cos\theta + 1, & 0 < \theta < \pi \\ \cos\theta + 3, & \pi < \theta < 2\pi \end{cases} \qquad (5)$$

The position of the point P is determined based on the formula (4) and (5):

$$\text{if } 0 < \theta < \pi, P = O + R\left(\vec{x}(1-u) + \vec{y}\sqrt{1-(1-u)^2}\right) \qquad (6)$$

$$\text{if } \pi < \theta < 2\pi, P = O + R\left(\vec{x}(u-3) + \vec{y}\sqrt{1-(u-3)^2}\right) \qquad (7)$$

Furthermore, assuming that the point M is a projection point of the point P on the curved surface $S_i$, $\vec{n}$ is the normal vector of the surface $S_i$ pointing to the inner side of the specified space area, and $\vec{n}$ passes through the point M, according to the formulas (6) and (7):

$$\text{If } 0 < \theta < \pi, \vec{PM} = O + R\left(\vec{x}(1-u) + \vec{y}\sqrt{1-(1-u)^2}\right) - \qquad (8)$$
$$M = \vec{MO} + R\left(\vec{x}(1-u) + \vec{y}\sqrt{1-(1-u)^2}\right)$$

$$\text{If } \pi < \theta < 2\pi, \vec{PM} = O + R\left(\vec{x}(u-3) + \vec{y}\sqrt{1-(u-3)^2}\right) - M = \vec{MO} \qquad (9)$$
$$+ R\left(\vec{x}(u-3) + \vec{y}\sqrt{1-(u-3)^2}\right)$$

Therefore, the point set of the arc AB on the side of the normal vector $\vec{n}$ is determined to satisfy the following inequality based on the first inequality and the formula (8) and (9):

$$\text{If } 0 < \theta < \pi, \vec{MO} \times \vec{n} + R\left(\left(\vec{x}(1-u) + \vec{y}\sqrt{1-(1-u)^2}\right) \times \vec{n}\right) < 0 \qquad (10)$$

If $\pi < \theta <$ (11)

$$2\pi, \vec{MO} \times \vec{n} + R\left(\left(\vec{x}(u-3) + \vec{y}\sqrt{1-(u-3)^2}\right) \times \vec{n}\right) < 0$$

The range of the trajectory parameter u, that is, the point set $U_i$ of the arc AB on the inner side of the surface $S_i$, is obtained by solving the inequality (10) and (11).

Figure 9:
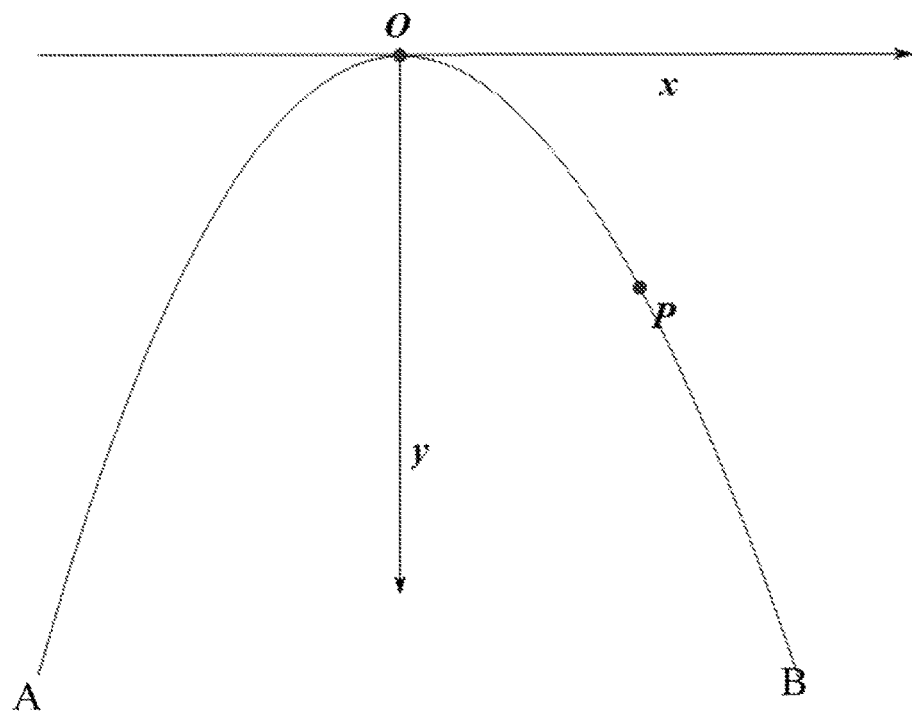
FIG. 9 is a schematic diagram of determining the position of any point on the trajectory in the case that the trajectory is a parabola.

Referring to FIG. 9, a schematic diagram of determining the position of any point on the trajectory in the case that the trajectory is a parabola is depicted.

In the case that the trajectory AB corresponding to the obtained data is a parabola, an unit vector which is in the axis direction of the parabola AB is assumed as $\vec{y}$ and an unit direction vector which is in a same plane and perpendicular to the axis direction is assumed as $\vec{x}$ and a, b and c are the constants of the parabola AB, the position of the point P can be expressed as:

$$P = u \times \vec{x} + (au^2 + bu + c) \quad (12)$$

Where, the x in a parabolic equation $y=ax^2+bx+c$ is replaced by the trajectory parameter u, which represents a distance to the point O in the direction of the horizontal axis.

Furthermore, the point M is a projection point of the point P on the curved surface $S_i$, $\vec{n}$ is the normal vector of the surface $S_i$ pointing to the inner side of the specified space area, and $\vec{n}$ 0 passes through the point M.

Therefore, a point set of the parabola AB on a side of the normal vector $\vec{n}$ that is, the point set $U_i$ of the parabola AB on the inner side of the surface $S_i$, is determined based on the first inequality and the formula (12).

Figure 10:
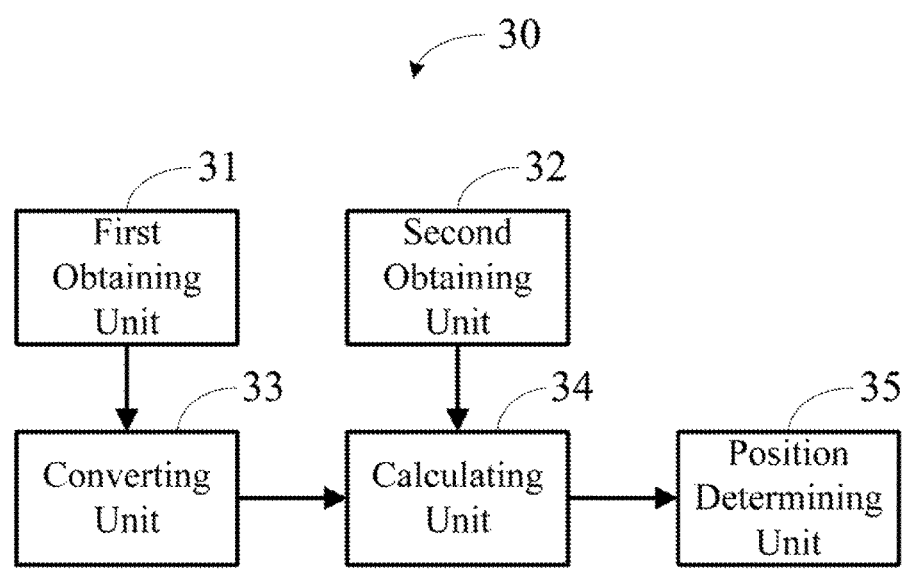
FIG. 10 is a schematic diagram of the structure of a machine processing trajectory space detecting device according to an embodiment of the present disclosure.

Referring to FIG. 10, a schematic diagram of the structure of a machine processing trajectory space detecting device according to an embodiment of the present disclosure is depicted. The device 30 includes:

a first obtaining unit 31 configured to obtain the data of the trajectory AB of the machine processing.

a second obtaining unit 32 configured to obtain the spatial data of the specified space area.

a converting unit 33 configured to convert the function of the data of the trajectory AB obtained by the first obtaining unit 31 into the univariate function P=f (u) which is with respect to the trajectory parameter u, where P is any point on the trajectory AB.

a calculating unit 34 configured to determine the spatial data of individual curved surfaces $S_i$ forming the specified space area based on the spatial data of the specified space area obtained by the second obtaining unit 32, and calculate the point set $U_i$ of the trajectory AB on the inner side of each curved surface $S_i$ based on the spatial data of the individual curved surfaces $S_i$ and the function P=f (u) produced by the converting unit, where 1≤i≤m, and m is the amount of the curved surface forming the specified space area.

a position determining unit 35 configured to determine the positional relationship between the trajectory AB and the specified space area based on the point sets $U_i$ obtained by the calculating unit 34.

Specifically, the calculating unit 34 is configured to calculate the point set $U_i$ of the trajectory AB on the inner side of each curved surface $S_i$ based on the first inequality as follows:

$$\vec{PM} \times \vec{n} < 0$$

where, P is any point on the trajectory AB, M is a projection point of the point P on the curved surface $S_i$, $\vec{n}$ is a normal vector of the curved surface $S_i$ pointing to the inner side of the specified space area, and $\vec{n}$ passes through the point M.

The position determining unit 35 is configured to determine the intersection $U_z=U_1 \cap U_2 \ldots \cap U_n$ of the point sets $U_i$ based on the point sets Ui obtained by the calculating unit 34, and determine the positional relationship between the trajectory AB and the specified space area based on the relationship between $U_T$ and $U_z$:

if $U_T \subset U_z$, the position determining unit 35 determines that the trajectory AB is on the inner side of the specified space area.

if $U_z \cap U_T = \emptyset$, the position determining unit 35 determines that the trajectory AB is completely outside the specified space area.

Where, $U_T$ is a set of the point sets of the trajectory AB.

Figure 11:
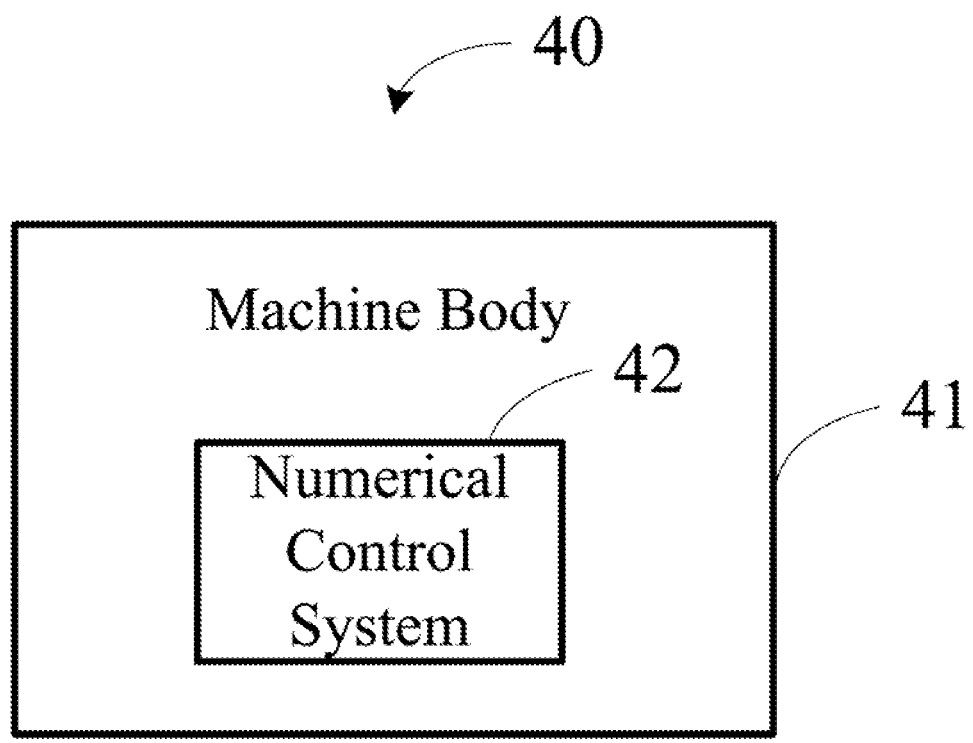
FIG. 11 is a schematic diagram of the structure of a numerical control machine according to an embodiment of the present disclosure.
Figure 12:
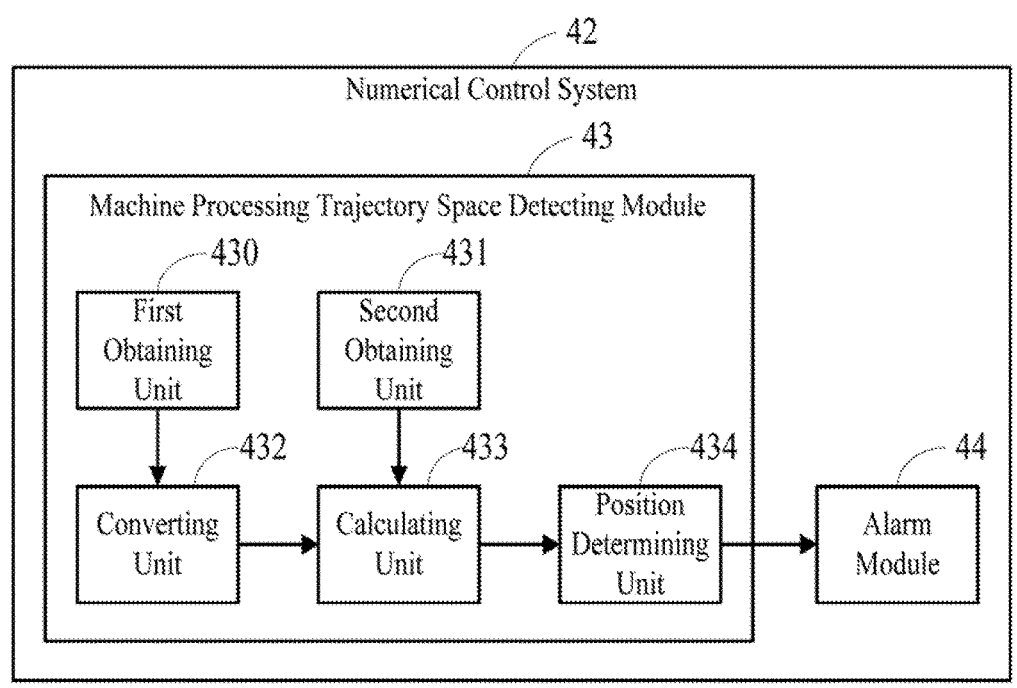
FIG. 12 is a schematic diagram of the structure of a numerical control system according to an embodiment of the present disclosure.

Referring to FIGS. 11 and 12, a schematic diagram of the structure of a numerical control machine is depicted. The numerical control machine 40 includes a machine body 41 and a numerical control system 42 installed on the machine body 41. The numerical control system 42 includes a machine processing trajectory space detecting module 43. The machine processing trajectory space detecting module 43 includes:

a first obtaining unit 430 configured to obtain the data of the trajectory AB of the machine processing.

a second obtaining unit 431 configured to obtain the spatial data of the specified space area.

a converting unit 432 configured to convert the function of the data of the trajectory AB obtained by the first obtaining unit 430 into the univariate function P=f (u) which is with respect to the trajectory parameter u, where P is any point on the trajectory AB.

a calculating unit 433 configured to determine the spatial data of individual curved surfaces $S_i$ forming the specified space area based on the spatial data of the specified space area obtained by the second obtaining unit 431, and calculate the point set $U_i$ of the trajectory AB on the inner side of each curved surface $S_i$ based on the spatial data of the individual curved surfaces $S_i$ and the function P=f (u) produced by the converting unit 432, where 1≤i≤m, and m is the amount of the curved surface forming the specified space area;

a position determining unit 434 configured to determine the positional relationship between the trajectory AB and the specified space area based on the point sets $U_i$ obtained by the calculating unit 433.

Furthermore, the numerical control system 42 further includes: an alarm module 44 configured to issue an alarm information when the positional relationship between the trajectory AB and the specified space area determined by the machine processing trajectory space detecting module 43 does not meet a predetermined safety relationship.

Figure 13:
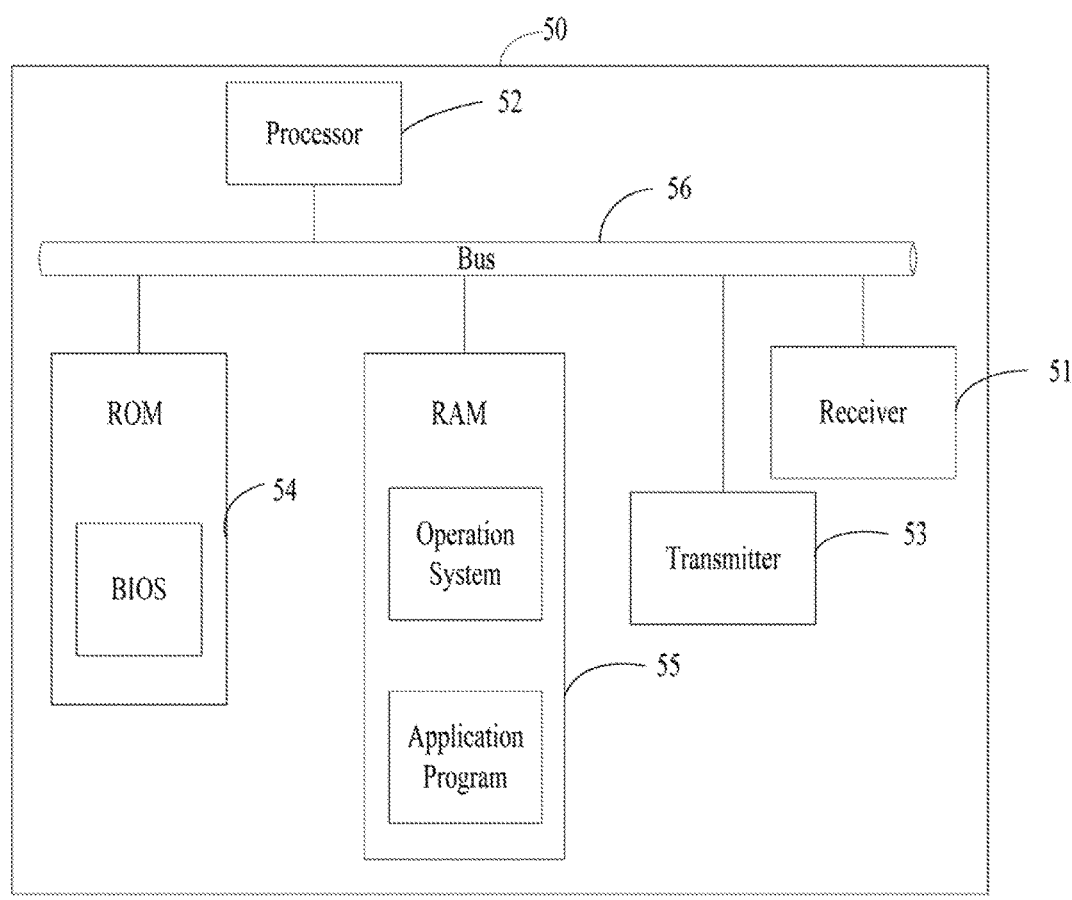
FIG. 13 is a schematic diagram of the structure of a machine processing trajectory space detecting device according to another embodiment of the present disclosure.

Referring to FIG. 13, a schematic diagram of the structure of a machine processing trajectory space detecting device according to another embodiment of the present disclosure is depicted. The device 50 in this embodiment is a terminal, which may be a computer. The device 50 includes a receiver 51, a processor 52, a transmitter 53, a read only memory 54, a random access memory 55, and a bus 56.

The receiver 51 is configured to receive data.

The processor 52 is configured to control the operation of the device 50, which may be a CPU (Central Processing Unit). The processor 52 may be an integrated circuit chip with signal processing capability. The processor 52 may also be a general purpose processor, a digital signal processor (DSP), an application specific integrated circuit (ASIC), a field programmable gate array (FPGA), other programmable logic devices, a discrete gate, a transistor logic device, or a discrete hardware component. The general purpose processor may be a microprocessor or any conventional processor.

The transmitter 53 is configured to transmit data.

The memory may include the read-only memory 54 and the random access memory 55, and provide instructions and data to the processor 52. A portion of the memory may also include a nonvolatile random access memory (NVRAM).

The components of the device 50 are coupled with each other via the bus 56. In addition to data bus, the bus 56 may include a power bus, a control bus, and a status signal bus. However, for the sake of clarity, various buses are designated as the bus 56 in the figure.

The memory stores the following elements, executable modules or data structures, or their subsets or expansion sets:

operation instructions: include a variety of operation instructions utilized to achieve a variety of operations.

operation system: includes various system programs utilized to implement various basic services and handle hardware-based tasks.

In this embodiment, the processor 52 performs the following operations by calling operation instructions stored in the memory (the operation instructions can be stored in the operation system):

obtain the data of the trajectory AB of the machine processing.

obtain the spatial data of the specified space area.

convert the function of the data of the trajectory AB into the univariate function P=f (u) with respect to the trajectory parameter u, where P is any point on the trajectory AB.

determine the point set $U_i$ of the trajectory AB on the inner side of each curved surface $S_i$ based on the spatial data of the individual curved surfaces $S_i$ forming the specified space area and the function P=f (u), where 1≤i≤m, and m is the amount of the curved surface forming the specified space area.

determine the positional relationship between the trajectory AB and the specified space area based on the point sets $U_i$.

Optionally, the processor 52 can be configured to utilize the first inequality as follows to calculate the point set $U_i$ of the trajectory AB on the inner side of each curved surface $S_i$:

$$\overrightarrow{PM} \times \overrightarrow{n} < 0$$

Where, P is any point on the trajectory AB, M is a projection point of the point P on the curved surface $S_i$, $\overrightarrow{n}$ is a normal vector of the curved surface $S_i$ pointing to the inner side of the specified space area, and $\overrightarrow{n}$ passes through the point M.

Optionally, the processor 52 can be configured to obtain the intersection $U_z = U_1 \cap U_2 \ldots \cap U_m$ of the point sets $U_i$:

if $U_T \subset U_z$, the trajectory AB is determined to be on the inner side of all the curved surfaces $S_i$, thereby determining that the trajectory AB is on the inner side of the specified space area, wherein $U_T$ is a set of the point sets of the trajectory AB.

if $U_z \cap U_T = \emptyset$, the trajectory AB is determined to be completely outside the specified space area. Where, $U_T$ is a set of the point sets of the trajectory AB.

Furthermore, the present disclosure also provides a computer storage medium. The computer storage medium includes computer program codes. The computer program codes cause a computer processor to execute a machine processing trajectory space detecting method when the computer program codes are executed by the computer processor. The method includes:

obtaining the data of the trajectory AB of the machine processing.

obtaining the spatial data of the specified space area.

converting the function of the data of the trajectory AB into the univariate function P=f (u) with respect to the trajectory parameter u, where P is any point on the trajectory AB.

determining the point set $U_i$ of the trajectory AB on the inner side of each curved surface $S_i$ based on spatial data of the individual curved surfaces $S_i$ forming the specified space area and the function P=f (u), where 1≤i≤m, and m is the amount of the curved surface forming the specified space area.

determining the positional relationship between the trajectory AB and the specified space area based on the point sets $U_i$.

The disclosure provides a method, devices, a numerical control machine, and a computer storage medium for detecting machine processing trajectory space, which express the spatial curve via a univariate function so as to participate in the operation of the space area for the curve, express the point sets of any portion of the trajectory via the trajectory parameter set, determines the position of the individual curved surfaces forming the space area and the trajectory, and eventually determine the positions of the space area and the curve. Consequently, the defect of algorithm explosion caused by the space geometry operation which needs to analysis the specific area and straight line type is overcame, which reduces the quantity of operations, and has high reusability.

The above description depicts merely some exemplary embodiments of the disclosure, but the person skilled in the art can make various modifications after reading the present disclosure without departing from the spirit and scope of the present disclosure.

What is claimed is:

1. A method for detecting machine processing trajectory space of numerical control machine, comprising:

obtaining data of a trajectory AB of a machine processing;

obtaining spatial data of a specified space area;

converting a function of the data of the trajectory AB into a univariate function P=f(u) with respect to a trajectory parameter u, wherein P is any point on the trajectory AB;

determining a point set $U_i$ of the trajectory AB on an inner side of each curved surface $S_i$ basing on spatial data of the individual curved surfaces $S_i$ forming the specified space area and the function P=f(u), wherein 1≤i≤m, and m is the amount of the curved surface forming the specified space area; and determining a positional relationship between the trajectory AB and the specified space area basing on the point sets $U_i$;

wherein the determining the point set $U_i$ of the trajectory AB on the inner side of each curved surface $S_i$ basing on spatial data of the individual curved surfaces $S_i$ forming the specified space area and the function P=f(u) comprises:

utilizing a first inequality as follows to calculate the point set $U_i$ of the trajectory AB on the inner side of each curved surface $S_i$:

$$\vec{PM} \times \vec{n} < 0;$$

wherein, P is any point on the trajectory AB, M is a projection point of the point P on the curved surface $S_i$, $\vec{n}$ is a normal vector of the curved surface $S_i$ pointing to the inner side of the specified space area, and $\vec{n}$ passes through the point M; and wherein the determining the positional relationship between the trajectory AB and the specified space area basing on the point sets $U_i$ comprises:

obtaining the intersection $U_z = U_1 \cap U_2 \ldots \cap U_m$ of the point sets $U_i$; and determining that the trajectory AB is on the inner side of all the curved surfaces $S_i$ if $U_T \subset U_z$, so as to determine that the trajectory AB is on an inner side of the specified space area, wherein $U_T$ is a set of the point sets of the trajectory AB.

2. The method of claim 1, wherein if $U_z \cap U_T = \emptyset$, determining that the trajectory AB is completely outside the specified space area.

3. A machine processing trajectory space detecting device of numerical control machine comprising a memory and a processor connected to the memory, wherein the processor is configured to:

obtain data of a trajectory AB of a machine processing;

obtain spatial data of a specified space area;

convert a function of the data of the trajectory AB into a univariate function P=f(u) with respect to a trajectory parameter u, wherein P is any point on the trajectory AB;

determine a point set $U_i$ of the trajectory AB on an inner side of each curved surface $S_i$ basing on spatial data of the individual curved surfaces $S_i$ forming the specified space area and the function P=f(u), wherein $1 \le i \le m$, and m is the amount of the curved surface forming the specified space area; and determine a positional relationship between the trajectory AB and the specified space area basing on the point sets $U_i$;

wherein the processor is further configured to:

utilize a first inequality as follows to calculate the point set $U_i$ of the trajectory AB on the inner side of each curved surface $S_i$:

$$\vec{PM} \times \vec{n} < 0;$$

wherein, P is any point on the trajectory AB, M is a projection point of the point P on the curved surface $S_i$, $\vec{n}$ is a normal vector of the curved surface $S_i$ pointing to the inner side of the specified space area, and $\vec{n}$ passes through the point M; and the processor is further configured to:

obtain an intersection $U_z = U_1 \cap U_2 \ldots \cap U_m$ of the point sets $U_i$;

determine that the trajectory AB is on the inner side of all the curved surfaces $S_i$ if $U_T \subset U_z$, so as to determine that the trajectory AB is on an inner side of the specified space area, wherein $U_T$ is a set of the point sets of the trajectory AB.

4. The device of claim 3, wherein the processor is further configured to:

determine that the trajectory AB is completely outside the specified space area if $U_z \cap U_T = \emptyset$.

\* \* \* \* \*